United States Patent
Biermann et al.

(10) Patent No.: US 6,840,362 B2
(45) Date of Patent: Jan. 11, 2005

(54) SHIFTING ELEMENT SYSTEM

(75) Inventors: Eberhard Biermann, Ravensburg (DE); Peter Tiesler, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/645,219

(22) Filed: Aug. 21, 2003

(65) Prior Publication Data

US 2004/0053724 A1 Mar. 18, 2004

(30) Foreign Application Priority Data

Sep. 14, 2002 (DE) .......................................... 102 42 822

(51) Int. Cl.⁷ .............................................. F16H 63/30
(52) U.S. Cl. ............... 192/48.92; 192/45.1; 192/85 AA
(58) Field of Search ............................. 192/41 R, 45.1, 192/48.92, 85 AA, 85 CA, 110 S

(56) References Cited

U.S. PATENT DOCUMENTS

| | | | | |
|---|---|---|---|---|
| 3,750,783 A | * | 8/1973 | Ohtsuka et al. ................ 192/45 |
| 5,129,495 A | | 7/1992 | Johnston et al. .......... 192/48.92 |
| 5,186,693 A | * | 2/1993 | Nishida et al. .............. 475/148 |
| 5,261,862 A | | 11/1993 | Pierce .......................... 475/275 |
| 5,267,917 A | * | 12/1993 | Kadotani et al. ............ 475/318 |
| 5,275,268 A | * | 1/1994 | Masuda .................... 192/48.92 |
| 5,928,104 A | * | 7/1999 | Kimura et al. .............. 475/318 |
| 6,120,410 A | | 9/2000 | Taniguchi et al. ........... 475/285 |
| 6,468,177 B2 | * | 10/2002 | Park ........................... 475/271 |
| 2001/0012808 A1 | | 8/2001 | Tajima et al. ................ 475/146 |

FOREIGN PATENT DOCUMENTS

| | | | | |
|---|---|---|---|---|
| DE | 101 31 816 A1 | 1/2003 | ........... F16H/63/30 |
| EP | 04684 682 B1 | 1/1995 | ........... F16D/25/10 |
| JP | 58-170925 A | * | 10/2002 | |

* cited by examiner

*Primary Examiner*—Saul Rodriguez
(74) *Attorney, Agent, or Firm*—Davis & Bujold, P.L.L.C.

(57) ABSTRACT

A shifting element system for a transmission comprising at least one first shifting element (10) and one free wheel (20) wherein one input element of the free wheel (20) is mechanically coupled with one input element of the first shifting element (10) and wherein one output element of the free wheel (20) is non-torsionally connected with one output element of the first shifting element (10). It is proposed that input and output elements of the first shifting element (10), discs (17) of the first shifting element (10), a free wheel (20) and input and output elements of the free wheel (20) form a pre-assemblable unit wherein a free-wheel sprag unit (27) of the free wheel (20) has one bending elastic holding device (28) by which the input element of the free wheel (20), during and after assembly of the pre-assembled unit, is axially movably secured opposite the output element of the first shifting element (10).

22 Claims, 1 Drawing Sheet

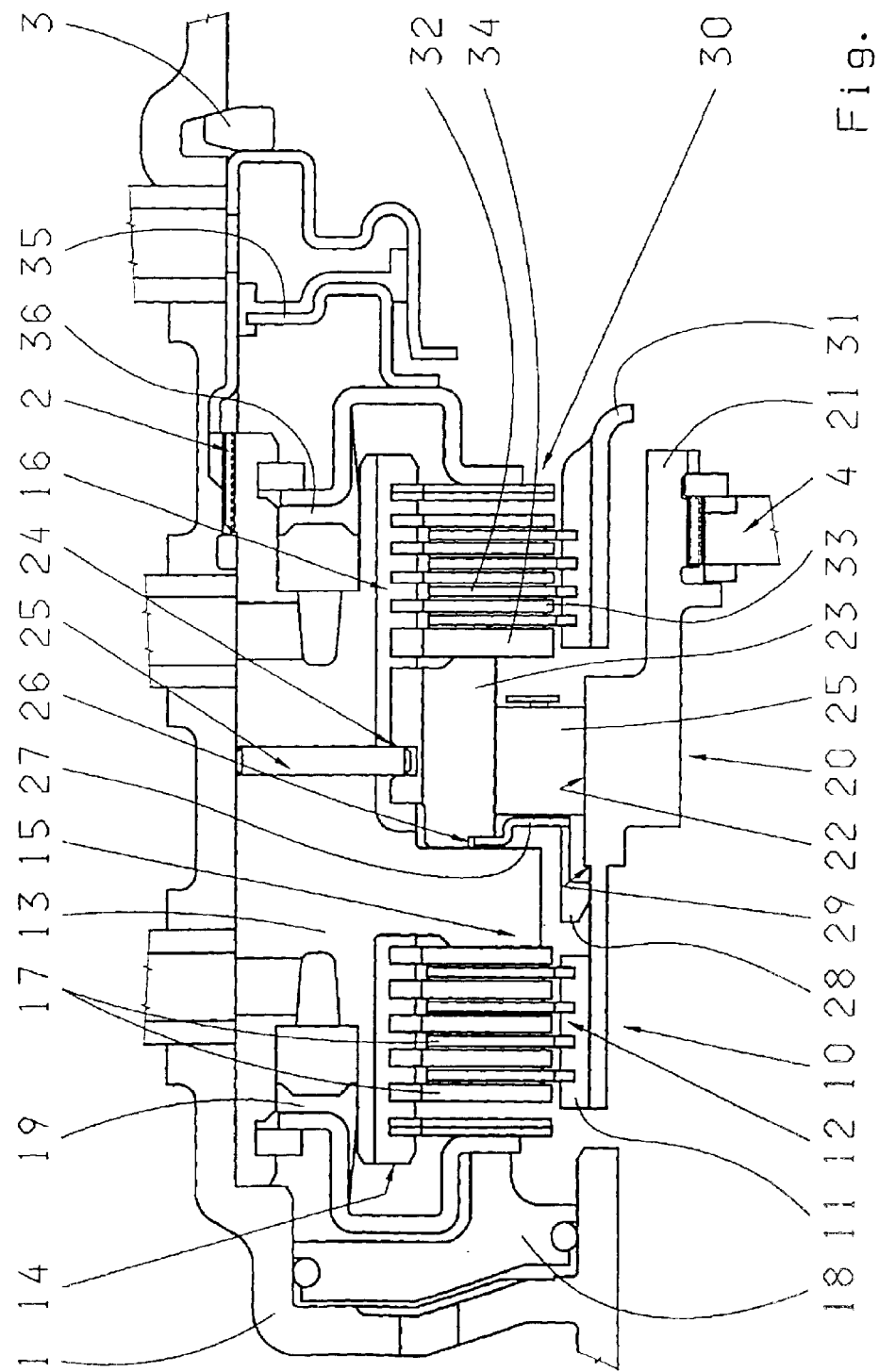

SHIFTING ELEMENT SYSTEM

FIELD OF THE INVENTION

The invention relates to a shifting element system for a transmission comprising at least one shifting element and one free wheel whose input element is mechanically coupled with an input element of the shifting element and whose output element is non-torsionally connected with one output element of the shifting element.

BACKGROUND OF THE INVENTION

U.S. Pat. No. 5,261,862 has disclosed an arrangement of components for a multi-step automatic transmission in which one shifting element designed as multi-disc brake and one free wheel functionally coordinated with said multi-disc brake and designed as a roller free wheel are disposed side-by-side in an axial direction. The free wheel here abuts axially directly against a disc set of the multi-disc brake. One transmission housing forms the outer disc carrier of the multi-disc brake with a spline section in which non-torsionally and axially movably engages the outer discs of the multi-disc brake and one outer ring of the free wheel. The free-wheel outer ring is fixed in the axial direction, on one side, via a guard ring which engages in a groove of the disc spline section of the transmission housing. When the multi-disc brake is actuated, the discs support themselves in the axial direction against the free-wheel inner ring which, in turn, supports itself via a supporting disc on the guard ring by which the free-wheel outer ring is axially fixed. An inner disc carrier of the multi-disc brake has a spline section in which both the inner or lining discs of the multi-disc brake non-torsionally and axially movably engage the same as an inner ring of the free wheel.

As an assembly sequence in the arrangement of components of U.S. Pat. No. 5,261,862, one hydraulic actuating device (piston, recoil spring) is evidently first introduced in the transmission housing, then the disc set, then the free wheel and then the supporting disc and subsequently the guard ring is assembled for axial fixing. The inner disc carrier of the multi-disc brake is thereafter assembled in a subsequent step.

A similar arrangement of components with one multi-disc brake and a free wheel, functionally coordinated with said multi-disc brake, which abuts axially directly against a disc set of said multi-disc brake is also known from U.S. Pat. No. 6,120,410 for a multi-step automatic transmission with a non-coaxial input and output. Unlike the above described arrangement of components of U.S. Pat. No. 5,261,862, the disc set supports itself when the multi-disc brake is actuated, not via the free wheel on the transmission housing but via a separate first guard ring which engages in a corresponding groove of the disc spline section of the transmission housing. The free-wheel outer ring, which abuts against an outer disc of the disc set remote from the hydraulic actuating device of the multi-disc brake and is designed as an end disc, is non-torsionally introduced in the transmission housing. A second guard ring of said arrangement of components fixes the free-wheel outer ring in the transmission housing axially against the guard ring of the disc set. The inner disc carrier of the multi-disc brake and the free-wheel inner ring are designed in one piece as part of a cylindrical planet carrier of a planetary gear set situated, seen in the radial direction, below the multi-disc brake. Said cylindrical planet carrier, in addition, has upon the side of the disc set opposite the free-wheel one other spline section for accommodating discs of another multi-disc clutch which are, likewise, situated radially above the planetary gear set. The whole free-wheel with clamping bodies, a clamping body sprag unit and a free-wheel outer ring, together with the cylindrical planet carrier, conveniently form one assembly unit.

During the assembly of the multi-step automatic transmission comprising non-coaxial input and output as disclosed in U.S. Pat. No. 6,120,410, the hydraulic actuating device (piston, piston recoil spring) is evidently first introduced in the transmission housing of the multi-disc brake, thereafter a pre-assembled unit of the multi-disc clutch consisting of the outer disc carrier, the actuating device and the disc set. Due to the geometric dimensions of the multi-disc clutch, the disc set of the multi-disc brake can only be introduced just now in the transmission housing. Subsequently, the disc set is axially secured by the assembly of the first guard ring. During the assembly step that follows, the pre-assembled planetary gear set with its planet carrier (and the pre-assembled free-wheel) can be introduced in the transmission, both the disc spline sections of the multi-disc clutch and of the multi-disc brake with the corresponding spline sections of the corresponding lining or inner discs have to be brought to engagement and the positive fit of the free-wheel outer ring has to be produced in the transmission housing. Only thereafter does axial fixing of the free-wheel outer ring take place by the assembly of the second guard ring in the corresponding groove of the housing. It can be clearly seen that said assembly is costly, especially with regard to the "threading" of the cylindrical planet carrier with its two disc spline sections and the pre-assembled free-wheel.

U.S. Pat. No. 6,120,310 discloses one other arrangement of components for another automatic transmission with a coaxial input and output with one multi-disc brake and one free-wheel functionally coordinated therewith whose free wheel outer ring abuts axially directly against a disc set of said multi-disc brake. The transmission housing, in turn, forms the outer disc carrier of said multi-disc brake, the outer discs of the multi-disc brake are correspondingly introduced non-torsionally and axially movably in a disc spline section of the transmission housing. Starting with the assembly sequence, the hydraulic actuating device (piston, piston recoil spring) of the multi-disc brake must be first introduced in the transmission housing. The disc set of the multi-disc brake, after being assembled, is axially by a guard ring fixed in one direction that engages in a groove of the housing. The free wheel is located on the side of the disc set opposite to the hydraulic actuating device. The free-wheel outer ring abutting against the disc set here non-torsionally engages a spline section of the transmission housing without axial fixing. The free-wheel inner ring, as an input element of the free wheel, is firmly connected with a planet carrier which, in turn, is firmly connected with the inner disc carrier of the multi-disc brake. Therefore, in said arrangement of components of U.S. Pat. No. 6,120,410, the complete free wheel consisting of the free-wheel outer ring, the clamping body, the clamping sprag unit and the free-wheel inner ring is always assembled also together with a (pre-assembled) planetary gear set.

Known exclusively from the Applicant's not pre-published German patent application DE 101 31 816.2 is a clutch arrangement with two shifting elements respectively designed as multi-disc brakes and axially disposed side-by-side. One common outer disc carrier, discs of both multi-disc brakes and a hydraulic piston recoil device associated with each individual multi-disc brake form a pre-assemblable unit. The whole outer disc carrier is non-torsionally assembled in a transmission housing. Hydraulically actuatable pistons for operating the multi-disc brakes are each situated on the side of the respective disc set which lies opposite to the free wheel. A functional tying of the multi-disc brakes on a free wheel is not provided.

The problem on which this invention is based is to produce a shifting element system for a transmission comprising at least one shifting element and one free wheel functionally coordinated with the shifting element and whose structural elements can be assembled as easily and safely as possible in the transmission.

SUMMARY OF THE INVENTION

Departing from the known prior art, the shifting element unit has at least one first shifting element and one free wheel, one input element of the free wheel being mechanically coupled with one input element of the first shifting element and one output element of the free wheel being non-torsionally connected with one output element of the first shifting element. Preferably the free wheel, especially one clamping body of the free wheel, abuts at least predominantly in the axial direction against discs of the first shifting element. According to the invention, input and output elements of the first shifting element, the discs of the first shifting element, the free wheel and the input and the output elements of the free wheel form a pre-assemblable unit which, as a whole, can be installed pre-assembled within the transmission. The sprag unit of the free wheel has a bending elastic holding device by which the input element of the free wheel, during assembly of the pre-completed unit in the transmission, is axially movably secured opposite the input element of the first shifting element. Said axial securing reliably prevents an abnormal dropping out of the free-wheel input element movable in the axial direction during and after the assembly of the pre-assembled unit in the transmission, even if the transmission in its further assembly sequence is subsequently rotated or tilted around its transverse axis.

In a specially advantageous development of the invention, the input element of the first shifting element and the input element of the free wheel are made as one piece, the bending elastic holding device is designed as a snap-on spring of the free-wheel sprag unit axially movably engaging in the assembled state in a radial rear section which extends axially between the multi-disc toothing of the input element of the first shifting element and a tread of the clamping elements of the free wheel.

The first shifting element is particularly made as a multi-disc brake with one inner disc carrier as an input element and one outer disc carrier as an output element of the first shifting element. The input element of the free wheel is advantageously designed as a free-wheel inner ring and the outer element of the free wheel as a free-wheel outer ring. The pre-assembled unit is advantageously insertable as a whole within a housing of the transmission.

However, it can also be provided that the input element of the first shifting element is designed as an outer disc carrier, the output element of the first shifting element as an inner disc carrier, the input element of the free wheel as a free-wheel outer ring and the output element of the free wheel as a free-wheel inner ring. It can also be provided that the first shifting element be designed as a multi-disc clutch.

In another advantageous development of the invention, the pre-assemblable unit comprises, together with the input and output elements of the first shifting element, the discs of the first shifting element, the free wheel and the input and output elements of the free wheel, additional discs of a second shifting element. The discs of a second shifting element abut axially here against the output element of the free wheel on the side of the free wheel remote from the discs of the first shifting element.

BRIEF DESCRIPTION OF THE DRAWING

The invention will now be described, by way of example, with reference to the accompanying drawings in which:

FIG. 1 is a sectional drawing of a shifting element system having two multi-disc brakes and one free wheel functionally coordinated with the first multi-disc brake.

DETAILED DESCRIPTION OF THE INVENTION

With 10 is designated as a first shifting element designed, by way of example, as a multi-disc brake having an input element designed as inner disc carrier 11, one output element designed as an outer disc carrier 13 and discs 17 (inner or lining discs, outer discs). The inner disc carrier 11 has a cylindrical section with a multi-disc toothing 12 in which the lining discs non-torsionally but axially movably engage. The outer disc carrier 13 is non-torsionally introduced in a housing 1 of the transmission, via a spline section 2, and is fixed axially here via a guard ring 3. The discs 17 are situated in the area of a front side 14 of the cylindrical outer disc carrier 13 so as to be hydraulically actuated via a piston 18 coordinated with the first shifting element 10 and, likewise, situated in the transmission housing 1. When the first shifting element 10 is hydraulically actuated, the discs 17 support themselves on a front face of the disc-shaped ledge 15 of the outer disc carrier 13 which lies on the side remote from the piston 18 of the disc set consisting of the discs 17.

In the embodiment shown, a hydraulic reset device 19 is provided for resetting the piston 18, whose pressure space is integrated in the outer disc carrier 13 to implement a very compact design. Said pressure space within the outer disc carrier 13 is here disposed on a diameter larger than the discs 17 and, seen in an axial direction, radially above the discs 17. Instead of a hydraulic reset device 19, evidently a known mechanical reset device such as a cup spring or an annular coil spring set can also be provided.

With 20 is designated a free wheel having a free-wheel inner ring 21 as an input element, a free-wheel outer ring 23 as an output element and a free-wheel sprag unit 27 for guiding clamping elements of the free wheel 20. In the embodiment, the free wheel 20 is designed as a roller free wheel. But other free wheel designs evidently can also be provided, as for example, a clamping body free wheel. Spatially seen, the free wheel 20 is to a great extent axially at least situated next to the discs 17 of the first shifting element. The disc-shaped ledge 15 of the the outer disc carrier 13 is placed axially between the discs 17 and the free-wheel outer ring 23 with the free-wheel outer ring 23 axially directly abutting against a second front face of the disc-shaped ledge 15 upon the side of the ledge 15 remote from the discs 17. The free-wheel outer ring 23 has, on its contact surface facing the disc-shaped ledge 15 of the outer disc carrier, a ledge 26 in which the free-wheel sprag unit 27 engages as an axial locking device of the free-wheel sprag unit 27 between the ledge 15 of the outer disc carrier 13 and the free-wheel outer ring 27.

The free wheel 20 is functionally coordinated with the first shifting element 10. The free-wheel inner ring 21 of the free wheel 20 is fixedly connected with the inner disc carrier 11 of the first shifting element 10. In the embodiment shown, inner disc carrier 11 and free-wheel inner ring 21 are designed as a one-piece part and connected by a positive fit with an input element 4 via a spline section. The input element 4 can be, for example, a planet carrier of a planetary gear set. In another development, inner disc carrier 11 and free-wheel inner ring 21 evidently can also be made as separate elements which are interconnected by suitable means in a form locking or also a force locking manner.

In the embodiment shown, in addition, the free-wheel outer ring 23 is non-torsionally connected with the outer disc carrier 13 of the first shifting element 10. To this end, the free-wheel outer ring 23 has a spline section which engages with corresponding engaging gears 16 of the outer disc carrier 13. In the embodiment shown, the free-wheel outer ring 23 is axially fixed to the outer disc carrier 13 via a locking pin 25. The locking pin 25 is inserted horizontally, at least to a great extent, within the hole of the outer disc carrier 13 traversing the axis of rotation of the free wheel 20 and engages in a groove 24 of the free-wheel outer ring 23 extending in a peripheral direction.

After the axial locking of the free-wheel outer ring 23 by the locking pin 25, the free-wheel sprag unit 27 (and therewith also a holding device 27 to be explained later) is also fixed in an axial direction.

In another development of the axial locking of the free-wheel outer ring 23, instead of the locking pin 35, it is possible to provide a bolt or a fitted key, for example.

With 30 is designated a second shifting element likewise designed as a multi-disc brake having an input element designed as an inner disc carrier 31 with inner discs designed as lining discs 32 and outer discs 33 of which one is designed as end disc 34. The outer disc carrier 13 of the first shifting element 10 also serves simultaneously as an output element of the second shifting element 30. To this end, the outer discs 33 and the end disc 34 advantageously engage with the engaging gears 16 of the outer disc carrier 13 in which the free-wheel outer ring 23 also engages. The end disc 34 abuts in an axial direction, directly against the free-wheel outer ring 23 upon the side thereof remote from the first shifting element 10. The disc set of the second shifting element 30 is, therefore, situated on the side of the outer disc carrier 13 opposite the front face 14 of the outer disc carrier 13. Spatially regarded, the free wheel 20, therefore, separates the two shifting elements 10, 30 in the axial direction.

To actuate the second shifting element 30, one piston 35 is provided which is located outside the outer disc carrier 13 upon the side of the outer disc carrier 13 opposite the piston 18 of the first shifting element 10. As with the first shifting element 10, a hydraulic reset device 36 is provided for the second shifting element 30, the pressure space of which is integrated in a space-saving manner in the outer disc carrier 13, seen in the axial direction, radially above the discs 32, 33, 34 on a diameter larger than the discs 32, 33, 34. Instead of the hydraulic reset device 36, it is evidently possible to provide a known mechanical reset device such as a cup spring or an annular coil spring set.

According to the invention, the outer disc carrier 13 of the first shifting element 10, the discs 17 of the first shifting element 10, the inner disc carrier 11 of the first shifting element 10, the free-wheel outer ring 23, the free wheel 20, the free-wheel inner ring 21 and the discs 32, 33, 34 of the second shifting element 30 form a pre-assemblable unit. This pre-assembled unit is introduced as a whole in the transmission housing 1 and then axially fixed within the transmission housing 1 via the guard ring 3. Accordingly, the assembly sequence becomes simple in the transmission assembly.

According to the invention, the sprag unit 27 of the free wheel 20 has a bending elastic holding device 28 by which the free-wheel inner ring 21, during and after assembly of the pre-assembled unit in the transmission housing, is axially movably fixed opposite the outer disc carrier 13 of the first shifting element 10. In the embodiment shown, the bending elastic holding device 28 is designed as a snap-on spring which when assembled axially, movably engages in a radial rear section 29 of the free-wheel inner ring 21. Said radial rear section 29 extends axially between the multi-disc toothing 12 of the inner disc carrier 11 of the first shifting element 10 and a tread 22 of a clamping element of the free-wheel inner ring 21.

This axial locking reliably prevents the inner disc carrier/free-wheel inner movably combined in the axial direction from abnormally drop out during and after assembly of the pre-assembled unit within the transmission housing, even if the transmission housing is subsequently rotated or rocked around its transverse axis.

In the embodiment shown, the bending elastic holding device 28 (in a force-locking or a form-locking manner) is connected with the free-wheel sprag unit 27. In another development, free-wheel sprag unit 27 and bending elastic holding device 28 can also be made as one piece. In still another development, the bending elastic holding device 28 can be designed as part of spacers by which the clamping elements of the free wheel 20 are passed into the free-wheel sprag unit 27.

As already mentioned, the input element of the first shifting element 10 is designed, in the embodiment shown, as the inner disc carrier 11, the output element of the first shifting element 10 as the outer disc carrier 13, the input element of the free wheel 20 as the free-wheel inner ring 21 and the output element of the free wheel 20 as the free-wheel outer ring 23. In another development, instead of this it is possible to provide that the input element of the first shifting element is designed as the outer disc carrier, the output element of the first shifting element as the inner disc carrier, the input element of the free wheel as the free-wheel outer ring and the output element of the free wheel as the free-wheel inner ring.

In addition, the inventive shifting element system is not limited to the use of multi-disc brakes. Therefore, multi-disc clutches can be provided instead of the multi-disc brakes.

Reference Numerals 1 transmission housing
2 spline section
3 guard ring
4 input element
10 first shifting element
11 inner disc carrier of the first shifting element
12 multi-disc toothing of the inner disc carrier
13 outer disc carrier of the first shifting element
14 front side of the outer disc carrier
15 disc-shaped ledge of the outer disc carrier
16 engaging gears of the outer disc carrier
17 disc of the first shifting element
18 piston of the first shifting element
19 hydraulic reset device of the first shifting element
20 free wheel
21 free-wheel inner ring
22 clamping element tread of the free-wheel inner ring
23 free-wheel outer ring
24 groove of the free-wheel outer ring
25 locking pin
26 ledge of the free-wheel outer ring 27 free-wheel sprag unit
28 holding device
29 rear section
30 second shifting element
31 inner disc carrier of the second shifting element
32 lining disc of the second shifting element
33 outer disc of the second shifting element
34 end disc of the second shifting element
35 piston of the second shifting element
36 hydraulic reset device of the second shifting element

What is claimed is:

1. A shifting element system for a transmission comprising at least one first shifting element (10) and a free wheel (20) in which an input element of the free wheel (20) is mechanically coupled with one input element of the first shifting element (10) and in which one output element of the free wheel (20) is non-torsionally connected with one output element of the first shifting element (10);

wherein the input and output elements of the first shifting element (10), discs (17) of the first shifting element (10), the free wheel (20) and the input and the output elements of the free wheel (20) form a pre-assemblable unit, and a free-wheel sprag unit (27) of the free wheel (20) has one bent elastic holding device (28) by which the input element of the free wheel (20), both during and after assembly of the pre-assembled unit in the transmission, is axially movably fixed opposite the output element of the first shifting element (10).

2. The shifting element system according to claim 1, wherein the free wheel (20) is disposed, in an axial direction, adjacent the discs (17) of the first shifting element (10), a disc-shaped ledge (15) of the output element of the first shifting element (10) is situated between the discs (17) of the first shifting element (10) and the output element of the free wheel (20), the discs (17) of the first shifting element (10) directly abut against a first front face of the disc-shaped ledge (15) and support themselves during actuation of the first shifting element (10) in the axial direction, the output element of the free wheel (20) directly abuts against a second front face of the disc-shaped ledge (15) in the axial direction.

3. The shifting element system according to claim 1, wherein the unit comprises the input and output elements of the first shifting element (10), the discs (17) of the first shifting element (10), the free wheel (20) and the input and output elements of the free wheel (20) has in addition discs (32, 33, 34) of the second shifting element (30) which abut axially against the output element of the free wheel (20), on a side of the free wheel (20) remote from the discs (17) of the first shifting element (10).

4. The shifting element system according to claim 1, wherein one of the free-wheel sprag unit (27) and the holding device (28) of the free-wheel sprag unit (27) is axially fixed to the output element of the first shifting element (10).

5. The shifting element system according to claim 4, wherein one of the free-wheel sprag unit (27) and the holding device (28) of the free-wheel sprag unit (27) is axially fixed between the discs (17) of the first shifting element (10) and the output element of the free wheel (20).

6. The shifting element system according to claim 1, wherein the bent elastic holding device (28) is a snap-on spring.

7. The shifting element system according to claim 1, wherein the free-wheel sprag unit (27) of the free wheel (20) and the bent elastic holding device (28) form a one piece component.

8. The shifting element system according to claim 1, wherein the bent elastic holding device (28) is part of a spacer by which the clamping elements of the free wheel (20) are passed into the free-wheel sprag unit (27).

9. The shifting element system according to claim 1, wherein the input element of the first shifting element (10) and the input element of the free wheel (20) form a one piece component.

10. The shifting element system according to claim 9, wherein the bent elastic holding device (28), in an assembled state, axially movably engages with a radial rear section (29) of the input element of the free wheel (20) which extends axially between a multi-disc toothing (12) of the input element of the first shifting element (10) and a tread (22) of the clamping elements of the free wheel (20).

11. The shifting element system according to claim 1, wherein the output element of the free wheel (20) is axially fixed to the output element of the first shifting element (10).

12. The shifting element system according to claim 11, wherein the output element of the free wheel (20) has a circular groove (24) in which a locking element, for axial fixing of the output element of the free wheel (20), engages.

13. The shifting element system according to claim 11, wherein the locking element is one of a locking pin (25), a bolt and a key.

14. The shifting element system according to claim 3, wherein the output element of the first shifting element (10) has a gearing (16) in which the output element of the free wheel (20) and discs (33, 34) of the second shifting element (30) engage with a positive fit.

15. The shifting element system according to claim 3, wherein a hydraulic reset device (36), for the second shifting element (30), is at least partly integrated in the output element of the first shifting element (10).

16. The shifting element system according to claim 1, wherein a hydraulic reset device (19), for the first shifting element (20), is at least partly integrated in the output element of the first shifting element (10).

17. The shifting element system according to claim 1, wherein the input element of the first shifting element (10) is an inner disc carrier (11), the output element of the first shifting element (10) is an outer disc carrier (13), the input element of the free wheel (20) is a free-wheel inner ring (21) and the output element of the free wheel (20) is a free-wheel outer ring (23).

18. The shifting element system according to claim 1, wherein the input element of the first shifting element (10) is an outer disc carrier (13), the output element of the first shifting element (10) is an input disc carrier, the input element of the free wheel (20) is a free-wheel outer ring (23) and the output element of the free wheel (20) is a free-wheel inner ring (21).

19. The shifting element system according to claim 1, wherein the first shifting element (10) is a multi-disc brake, and the pre-assembled unit is being insertable as a whole within a transmission housing (1).

20. The shifting element system according to claim 1, wherein the first shifting element (10) is a multi-disc clutch.

21. The shifting element system according to claim 1, wherein the free wheel (20) is a roller free wheel.

22. The shifting element system according to claim 1, wherein the free wheel (20) is a clamping body free wheel.

* * * * *